(12) United States Patent
Vladimerou et al.

(10) Patent No.: US 11,023,753 B2
(45) Date of Patent: Jun. 1, 2021

(54) SYSTEM AND METHOD FOR DETERMINING A LANE CHANGE OF A PRECEDING VEHICLE

(71) Applicant: Toyota Motor Engineering & Manufacturing North America, Inc., Plano, TX (US)

(72) Inventors: Vladimeros Vladimerou, Whitmore Lake, MI (US); Miles J. Johnson, Ann Arbor, MI (US); Ahmed Sakr, Mountain View, CA (US); Gaurav Bansal, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 130 days.

(21) Appl. No.: 16/286,997

(22) Filed: Feb. 27, 2019

(65) Prior Publication Data

US 2020/0272838 A1 Aug. 27, 2020

(51) Int. Cl.
*G06K 9/62* (2006.01)
*G06K 9/00* (2006.01)
*G06K 9/46* (2006.01)
*H04W 4/46* (2018.01)

(52) U.S. Cl.
CPC ..... *G06K 9/00825* (2013.01); *G06K 9/00798* (2013.01); *G06K 9/4609* (2013.01); *G06K 9/6256* (2013.01); *G06K 9/6267* (2013.01); *H04W 4/46* (2018.02)

(58) Field of Classification Search
CPC ............. G06K 9/00825; G06K 9/4609; G06K 9/00798; G06K 9/6256; G06K 9/6267; H04W 4/46

USPC ....... 382/103, 104, 106, 107, 168, 173, 181, 382/190, 201, 224, 225, 254, 276, 291, 382/305; 410/2–4, 24, 26; 340/901, 905, 340/425.5; 701/1, 36, 400, 532; 318/560, 580, 587
See application file for complete search history.

(56) References Cited

U.S. PATENT DOCUMENTS

| 9,065,447 B2 | 6/2015 | Buttolo |
| 2003/0070851 A1 | 4/2003 | Winner et al. |
| 2003/0234127 A1* | 12/2003 | Sudou ................ B60K 31/0066 180/170 |

(Continued)

*Primary Examiner* — Sheela C Chawan
(74) *Attorney, Agent, or Firm* — Christopher G. Darrow; Darrow Mustafa PC (57) ABSTRACT

System, methods, and other embodiments described herein relate to detecting a lane change of a target vehicle ahead of an ego vehicle. In one approach, a method includes receiving communications from a target vehicle specifying state information about the target vehicle. The method includes determining a location of a first decision point at a first distance ahead of an ego vehicle and acquiring sensor data about the target vehicle. The method includes determining motion information about the target vehicle based on the sensor data. The motion information includes positions that the target vehicle occupied relative to the ego vehicle. The method includes storing the state information and motion information for a first amount of time, and determining whether the target vehicle has changed lanes based on the state information and the motion information that has been stored once the ego vehicle has reached the first decision position.

20 Claims, 5 Drawing Sheets

(56) References Cited

U.S. PATENT DOCUMENTS

| | | |
|---|---|---|
| 2005/0216171 A1 | 9/2005 | Heinrichs-Bartscher |
| 2007/0106475 A1* | 5/2007 | Kondoh .............. B60W 40/02 |
| | | 701/301 |
| 2010/0209885 A1 | 8/2010 | Chin et al. |
| 2017/0205235 A1* | 7/2017 | Vladimerou ........... G01C 21/16 |
| 2017/0242095 A1* | 8/2017 | Schuh ................ G05D 1/0293 |
| 2018/0043935 A1 | 2/2018 | Hashimoto et al. |
| 2018/0067491 A1 | 3/2018 | Oder et al. |
| 2018/0217610 A1* | 8/2018 | Schuh ................ G05D 1/0257 |
| 2019/0023273 A1* | 1/2019 | Ishioka ............... B60W 30/10 |

* cited by examiner

SYSTEM AND METHOD FOR DETERMINING A LANE CHANGE OF A PRECEDING VEHICLE

TECHNICAL FIELD

The subject matter described herein relates, in general, to a system and method for a vehicle system to automatically detect when a preceding vehicle changes lanes, and, more particularly, to leveraging a position history of the preceding vehicle to identify lane change patterns and path estimations.

BACKGROUND

Autonomous vehicles and driver-assist systems in vehicles may be equipped to determine a path to follow on, for example, a multi-lane road, and to detect preceding vehicles that may already be traveling along the path ahead. To carry out this function, vehicles may include communication devices to wirelessly exchange information (e.g., vehicle-to-vehicle (V2V) communication protocols), for example, about the speed and position of detected vehicles, and the vehicles may also include sensors that facilitate perceiving other vehicles as well as obstacles, pedestrians, and additional aspects of a surrounding environment. Multiple types of sensor data can be useful in various circumstances for improving perceptions of the surrounding environment and increasing the accuracy at which systems such as autonomous driving systems can perceive the noted aspects, plan and navigate accordingly.

In the context of path determination, sensors of the vehicle may be used to identify lanes for path finding functions and other autonomous operations. However, conventional methods of determining whether a preceding vehicle has changed lanes can involve multiple challenges associated with interpreting sensor data, determining a precise location of the preceding vehicle, and detection of lane boundaries, and so on.

SUMMARY

The disclosed systems and methods relate to a manner of improving determinations about lane changes for vehicles preceding an ego vehicle and improving path determination for the ego vehicle.

In one embodiment, the disclosed lane change detection system provides improved lane change detection capabilities by utilizing a V2V communication device to receive state information about a target vehicle, one or more sensors to acquire sensor data, which includes motion information about the target vehicle, a range module to determine a location of a first decision point located a first distance ahead of the ego vehicle, a buffer module to store the state information and the motion information for a first amount of time, a classification module to determine whether the target vehicle has changed lanes based, at least in part, on the stored state information and the stored motion information that is available once the ego vehicle has reached the first decision position.

In one embodiment, a method of detecting a lane change of a target vehicle ahead of an ego vehicle includes receiving communications from the target vehicle specifying at least state information about the target vehicle, determining a location of a first decision point at a first distance ahead of the ego vehicle, acquiring sensor data about the target vehicle, determining motion information about the target vehicle based on the sensor data, the motion information including a plurality of positions that the target vehicle occupied relative to the ego vehicle, storing the state information and the motion information for a first amount of time, and determining whether the target vehicle has changed lanes based, at least in part, on the stored state information and the stored motion information that is available once the ego vehicle has reached the first decision position.

In one embodiment, a non-transitory computer-readable medium for detecting a lane change of a target vehicle ahead of an ego vehicle includes instructions that, when executed by one or more processors, cause the one or more processors to receive communications from the target vehicle specifying at least state information about the target vehicle, determine a location of a first decision point at a first distance ahead of the ego vehicle, acquire sensor data about the target vehicle, determine motion information about the target vehicle based on the sensor data, the motion information including a plurality of positions that the target vehicle occupied relative to the ego vehicle, store the state information and the motion information for a first amount of time, and determine whether the target vehicle has changed lanes based, at least in part, on the stored state information and the stored motion information that is available once the ego vehicle has reached the first decision position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with detecting lane changes of preceding vehicles are disclosed. As mentioned previously, an ego vehicle may be equipped for perceiving aspects of the surrounding environment to carry out various autonomous or driver-assist functions. Nevertheless, difficulties can arise in accurately formulating determinations based on sensor data due to, for example, intrinsic errors present in the sensor data, insufficient sensor data, and so on. Additionally, using instantaneous sensor measurements of preceding vehicles to identify whether a preceding vehicle is changing lanes presents a unique challenge since road geometry may be unknown, sensor data may be inaccurate, and so on.

Therefore, a lane change detection system and associated methods is disclosed herein that provides an approach to leverage an increased amount of sensor data that improves accuracy in determining when a preceding vehicle has changed lanes and/or detecting characteristics of the path ahead. Moreover, the disclosed approach for improving lane change determinations can enhance various functions related to autonomous operation of the ego vehicle.

In one approach, upon detecting a target vehicle, the ego vehicle initiates collection of various types of data regarding the target vehicle and determines a decision point located a distance ahead of the ego vehicle. The decision point, which the system initially determines based, in part, on the respective speeds and positions of the ego vehicle and target vehicle, represents a location at which the system makes a lane change determination regarding the target vehicle. While traveling to the decision point the ego vehicle continues to obtain additional information regarding the target vehicle (e.g., updated speed measurements, updated location coordinates, etc.) that indicates a movement pattern of the target vehicle. When the ego vehicle reaches the decision point, the lane change detection system analyzes the available information, determines whether the target vehicle has changed lanes, and, if appropriate, determines a new location for a subsequent decision point.

In one embodiment, by analyzing the obtained information, the ego vehicle can also determine the shape of the preceding path that the target vehicle has already travelled. The ego vehicle can further use the data observations of multiple target vehicles to establish a series of measurements (i.e., position histories) from which relative path patterns for the target vehicles can be derived and, in aggregate, enhance the defined parameters of the preceding road.

Thus, the ego vehicle can use detected path patterns to determine whether target vehicles have changed lanes, and/or, in one embodiment, to infer a shape of the preceding lane, thereby improving the accuracy with which a driver is informed about the movements of preceding vehicles as well as improving operation of autonomous driving or driver-assist functions in relation to path planning, obstacle avoidance, lane changes, and the like.

Figure 1:
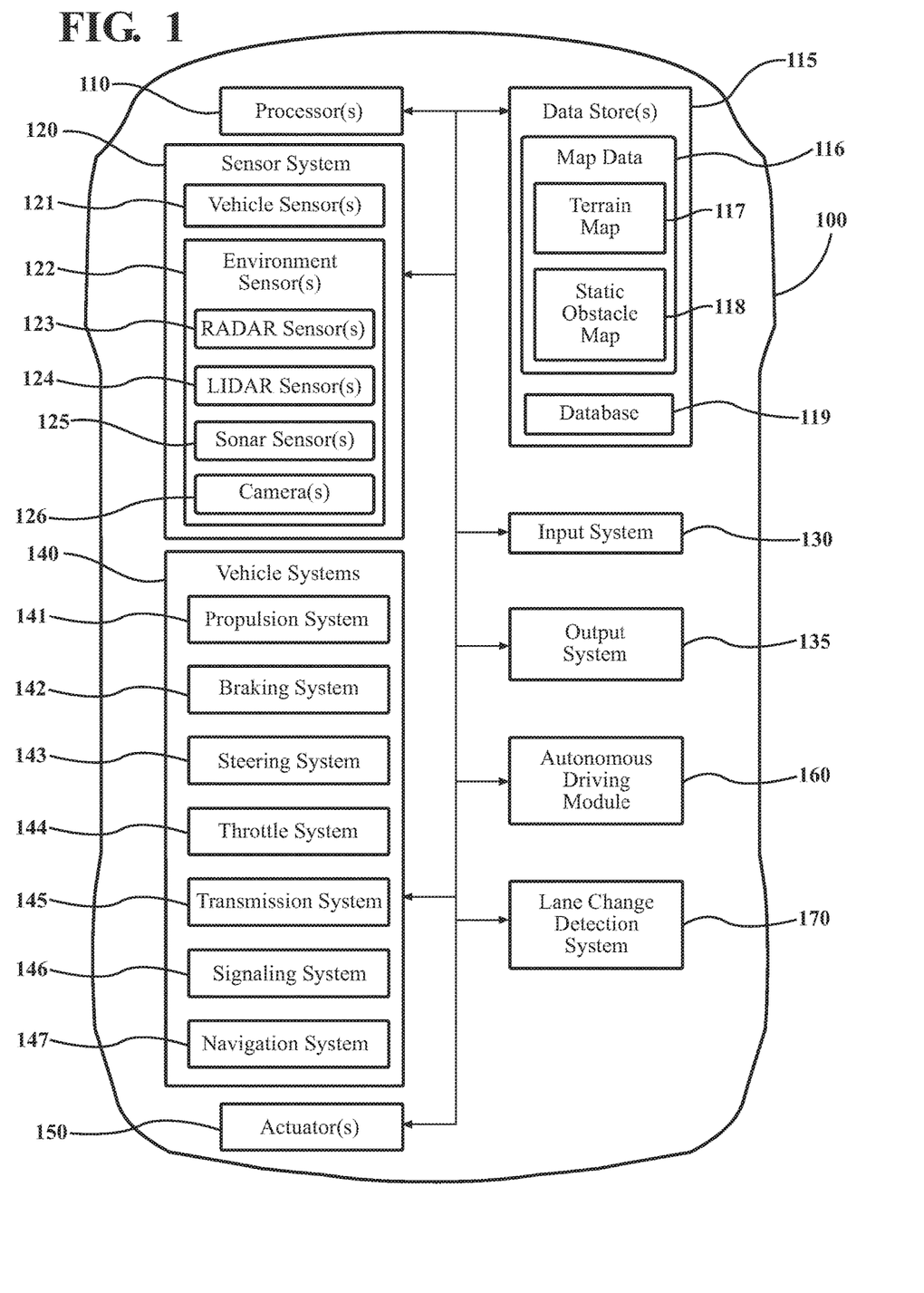
FIG. 1 illustrates one embodiment of a vehicle within which systems and methods disclosed herein may be implemented.

Referring to FIG. 1, an example of a vehicle 100 is illustrated. The vehicle 100 is generally referred to herein as the ego vehicle 100 since the disclosed approach is discussed from the perspective of the vehicle 100 developing awareness of the surrounding environment through V2V communications and acquired sensor data. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, is equipped for communicating with vehicles or other devices and includes sensors to perceive aspects of the surrounding environment, and thus benefits from the functionality discussed herein to, for example, determine lane changes of other entities travelling in relation to the vehicle 100.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 1-5B for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

As a further note, this disclosure generally discusses the vehicle 100 as traveling on a roadway with preceding (and other surrounding) vehicles, which, in one or more embodiments, are intended to be construed in a similar manner as the vehicle 100 itself. That is, the preceding vehicles can include, for example, any powered transport that may be encountered on a roadway by the vehicle 100 and from which the vehicle 100 can at least receive communications. Additionally, the disclosure generally discusses the vehicle 100 as traveling on a roadway that includes two lanes. However, the present approach to determining lane occupancy may be applied to any multi-lane roadways (e.g., 2, 3, 4 or more lanes traveling in a single direction), and so on.

In any case, the vehicle 100 includes a lane change detection system 170 that is implemented to perform methods and other functions as disclosed herein relating to collecting various types of information related to a preceding vehicle, with the collecting occurring over a determined distance, and detecting a lane change based at least in part on the collected sensor data. The noted functions and methods will become more apparent in the following discussion of the figures.

Figure 2:
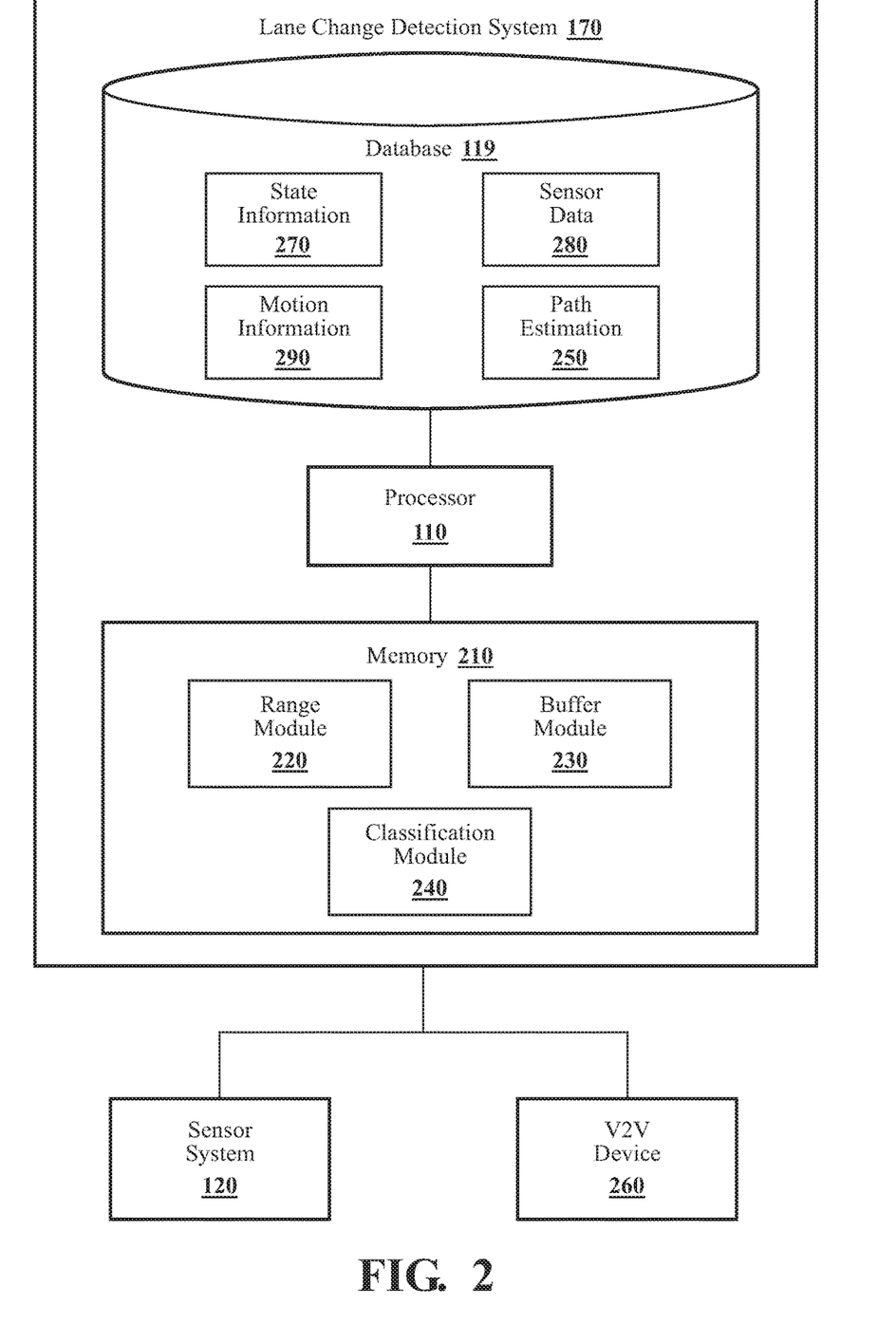
FIG. 2 illustrates one embodiment of a lane change detection system according to the disclosed embodiments.

With reference to FIG. 2, one embodiment of the lane change detection system 170 of FIG. 1 is illustrated. The lane change detection system 170 is shown as including a processor 110 and database 119 from the vehicle 100 of FIG. 1. Accordingly, the processor 110 may be a part of the lane change detection system 170, the lane change detection system 170 may include a separate processor from the processor 110 of the vehicle 100 or the lane change detection system 170 may access the processor 110 through a data bus or another communication path. In one embodiment, the lane change detection system 170 is operably connected with a vehicle sensor system 120, and a V2V communication device 260. Additionally, the lane change detection system 170, in one embodiment, includes a memory 210 that stores a range module 220, a buffer module 230, and a classification module 240. The memory 210 is a random-access memory (RAM), read-only memory (ROM), a hard-disk drive, a flash memory, or other suitable memory for storing the modules 220, 230 and 240. The modules 220, 230 and 240 are, for example, computer-readable instructions that when executed by the processor 110 cause the processor 110 to perform the various functions disclosed herein.

Accordingly, the range module 220 generally includes instructions that function to control the processor 110 to determine a location of a first decision point at a first distance ahead of the ego vehicle 100. As will be discussed in further detail below, the decision point represents a location at which the classification module 240 will determine whether the target vehicle has changed lanes based, at least in part, on the stored state information 270 and the stored motion information 290 that is available. Thus, in one embodiment, the decision point represents a point ahead in distance and time that provides the system 170 additional opportunity to acquire information about the target vehicle and, thus, better resolve the motion information 290 and/or the state information 270.

The buffer module 230 generally includes instructions that function to control the processor 110 to store state information 270 about the target vehicle received via the V2V device 260 (i.e., in a communication from the target vehicle), sensor data 280 received from one or more sensors of the vehicle 100, and motion information 290 derived from the sensor data 280 and/or state information 270. Each of these data types will be discussed in turn.

State information 270 refers to, in one or more arrangements, position-related information (e.g., location, GPS coordinates, latitude/longitude, speed, etc.) received from the target vehicle, for example, via V2V communication. The target vehicle can, in one or more embodiments, wirelessly communicate state information 270 regarding itself, for example, in an ongoing passive operation or in response to a request. Receipt of state information 270 can, in some cases, represent an initial detection of a target vehicle by the ego vehicle 100.

Sensor data 280, in one or more embodiments, refers to data generated by sensors of the ego vehicle 100 observing the surrounding environment. Sensor data 280 can include data indicative of obstacles, weather, temperature, lanes of a road, etc. In one aspect, the sensor data 280 provides relative measurements between the ego vehicle 100 and the surrounding objects (e.g., vehicles in adjacent lanes, preceding vehicles, pedestrians, etc.). The sensor data 280 may also include information other than the measurements that are used, for example, to identify the surrounding objects, identify signs, lane markings, and so on.

Motion information 290 refers to specific sensor data 280 or information derived from sensor data 280 and/or state information 270 that indicates speed and/or movement or positions of a preceding vehicle along a path. In contrast to the sensor data 280, which can encompass a variety of types of data collected for various purposes, motion information 290 is information about, for example, specific vehicles from specific frames of reference (e.g., distance, time, etc.) for the purpose of indicating the paths that the vehicles have travelled.

The lane change detection system 170 includes a database 119 in which the buffer module 230 stores the state information 270, sensor data 280, and motion information 290, as well as path estimations 250, which will be described further below. The database 119 is, in one embodiment, an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

The classification module 240, in one embodiment, includes instructions to perform processing and analysis operations that derive the motion information 290 from the sensor data 280, and path estimations 250 from motion information 290. For example, the classification module 240 initially analyzes the sensor data 280 to distinguish surrounding vehicles from the surrounding environment (e.g., background, roadway, etc.). In various approaches, the classification module 240 can execute object recognition techniques to identify surrounding vehicles and preceding vehicles. The exact techniques employed to identify the preceding vehicles may depend on available sensors within the vehicle 100, computational abilities (e.g., processor power) of the vehicle 100, and so on.

In one embodiment, the classification module 240 uses/implements a machine learning algorithm embedded within the classification module 240, such as a convolutional neural network (CNN), to perform semantic segmentation over the sensor data 280 from which the classification module 240 extracts and identifies preceding vehicles. The classification module 240 may employ different machine learning algorithms or implement different approaches for performing the semantic segmentation, which can include deep convolutional encoder-decoder architectures, a multi-scale context aggregation approach using dilated convolutions, or another suitable approach that generates semantic labels for the separate object classes represented in the image.

For example, the classification module 240 can use a supervised learning technique, such as support vector machines (SVM), random forest (RF), or decision trees with gradient boosting (GB). SVM classifiers construct a hyperplane or set of hyperplanes to discriminate between different classes using the labeled training data set. The SVM classifier uses these optimal hyperplanes to classify new feature vectors. An RF classifier is an ensemble algorithm that fits a set of decision tree classifiers from random subsets of a training data set. The RF classifier uses the average decision from these decision trees to classify each feature vector. A GB classifier is based on decision trees and gradient boosting to build the classification model in an iterative fashion.

Whichever exact approach the classification module 240 implements, the classification module 240 can provide an output with semantic labels identifying objects represented in the sensor data 280.

Furthermore, whichever approach is undertaken, the classification module 240 is generally capable of identifying preceding vehicles and acquiring their relative positions based on the sensor data 280 and/or state information 270. The classification module 240 can determine the relative positions by, for example, analyzing the sensor data 280 for each of the preceding vehicles relative to a center position of the ego vehicle 100. Alternatively, the classification module 240 can measure from a center point of a lane in which the ego vehicle 100 is traveling, a forward edge center point of the ego vehicle 100, a location of a controlling sensor, or another defined point relative to the ego vehicle 100.

The relative positions are therefore based on the sensor data 280 and/or the state information 270 and, in one embodiment, are quantities of distance and direction relative to measurements from the ego vehicle 100. The measurements can be in the form of line quantities (e.g., two endpoints on a 2D plane, etc.), or in another suitable form. Alternatively, the classification module 240 can generate the relative positions as 3D points relative to the ego vehicle 100, for example, to account for changes in elevation. In one embodiment, the classification module 240 stores the relative positions and/or measurements in a data structure (e.g., in database 119) that maintains a history of positions associated with a unique preceding vehicle. Each individual relative position can be, for example, a struct that stores one or more of a timestamp of the measurement, a unique identifier of the preceding vehicle associated with the measurement, an absolute coordinate if available, and position variance. The precise form can vary according to implementation.

The classification module 240 stores the positions and/or measurements in a data structure together in database 119 as a series or history of positions for each preceding vehicle as motion information 290. Based on the motion information 290 the classification module 240 can compute a path estimation 250 that represents a vehicle track, or path, for each of the preceding vehicles relative to the ego vehicle 100. The path estimation 250 provides an accurate approximation of actual travel paths for the preceding vehicles ahead of the ego vehicle 100. By analyzing the path estimation 250, the classification module 240 can determine whether a preceding vehicle has changed lanes and, in some circumstances, improve an understanding of the nature or shape of the path that lies ahead of the ego vehicle 100.

Figure 3:
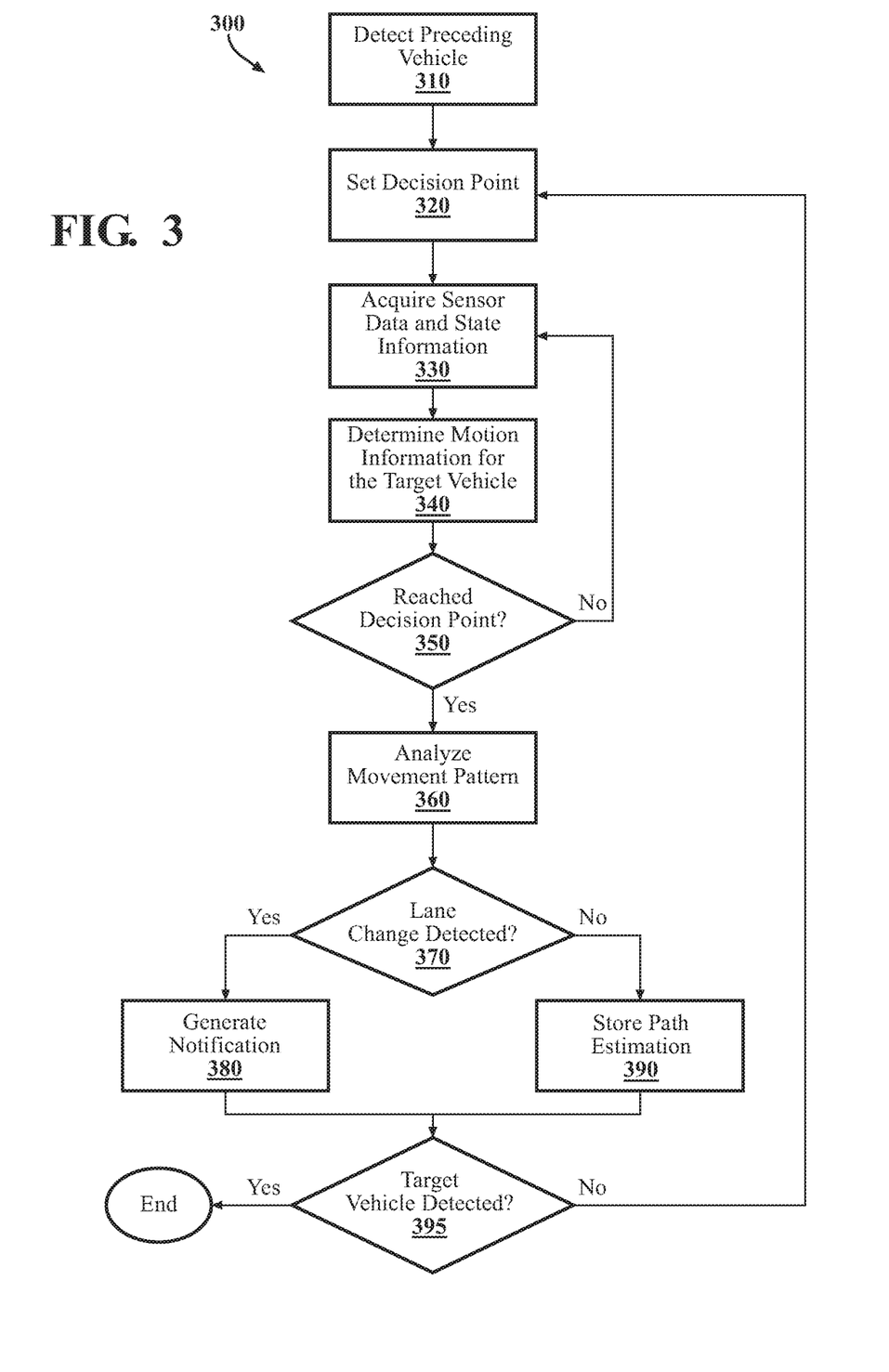
FIG. 3 illustrates one embodiment of a method of detecting a lane change according to the disclosed embodiments.

FIG. 3 illustrates a flowchart of a method 300 of detecting a lane change of a preceding vehicle according to the disclosed embodiments. Method 300 will be discussed from the perspective of the lane change detection system 170 of FIGS. 1 and 2. While method 300 is discussed in combination with the lane change detection system 170, it should be understood that the method 300 is not limited to implementation within the lane change detection system 170, which is merely one example of a system that may implement the method 300.

At operation 310, the ego vehicle 100 initially detects a preceding vehicle. Initial detection can occur, for example, by the system 170 receiving, from the preceding vehicle via the V2V communication device 260, the state information 270 in a V2V communication indicating a speed and location of the preceding vehicle, or from the sensor data 280 indicating the location and speed of the preceding vehicle.

At operation 320, the range module 220 determines a position of a decision point located a distance D ahead of the ego vehicle 100. The range module 220 can determine the position of the decision point differently for an initial detection of a target vehicle as opposed to ongoing tracking of the target vehicle.

For an initial detection of a target vehicle the range module 220 can determine the distance D based on various factors, such as the speed of the target vehicle, the location of the target vehicle, the speed of the ego vehicle 100, the location of the ego vehicle 100 and the maximum allowed buffer to collect data. For example, in one embodiment the range module 220 determines the distance D by calculating a range ahead wherein the target vehicle will remain at least a threshold distance T ahead of the ego vehicle 100 based on the current speed and position of the target vehicle and current speed and position of the ego vehicle 100. The distance D can further be subjected to soft minimum and maximum values within the determined range, and the threshold distance T can be determined dynamically in proportion to how far the target vehicle is ahead of the ego vehicle 100. That is, the threshold distance T can be increased as the distance between the ego vehicle 100 and the target vehicle increases, subject to the maximum allowed buffer for data collection.

Figure 4A:
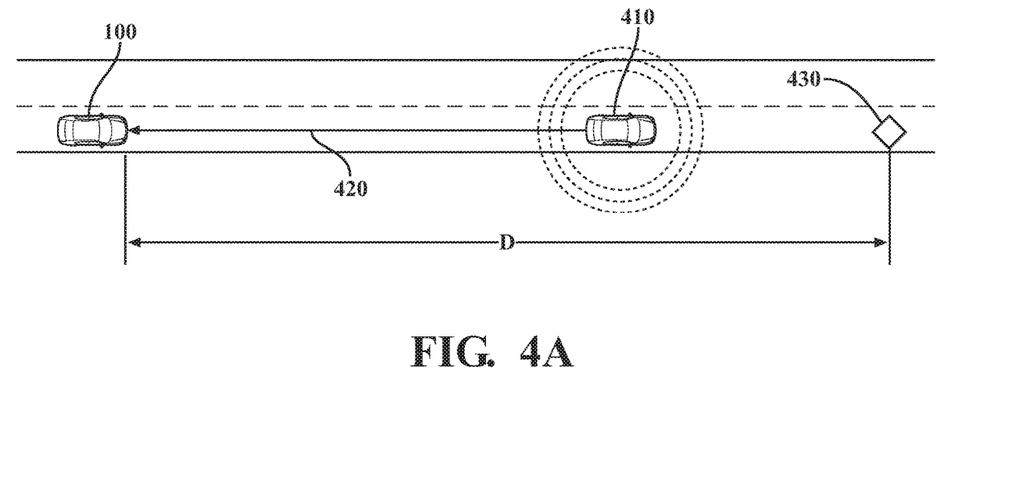
FIG. 4A illustrates a scenario of an ego vehicle setting a decision point according to the disclosed embodiments.

For example, FIG. 4A shows the ego vehicle 100 initially detecting a target vehicle 410 approximately 250 m ahead of the ego vehicle 100 based on a received V2V communication 420. The communication 420 indicates that the target vehicle 410 is traveling 65 mph. The ego vehicle 100 is traveling 70 mph. In this scenario the range module 220 can determine a threshold distance T in proportion to the 250 m distance between the ego vehicle 100 and the target vehicle 410. Based on the current speeds of the vehicles, the range module 220 determines that the target vehicle 410 will remain the threshold distance T ahead of the ego vehicle 100 for at least 300 m. Accordingly, the range module 220 sets the decision point 430 at a distance D of 300 m ahead of the ego vehicle 100.

Referring back to FIG. 3, at operation 330 the buffer module 230 stores state information 270 and/or sensor data 280 associated with the target vehicle. In one or more embodiments, the buffer module 230 can employ various techniques to acquire the sensor data 280. For example, the buffer module 230 may passively store interval samples of the sensor data 280 from a stream of electronic information provided by various sensors, can execute operations to fuse data from multiple sensors to obtain the sensor data 280, or the like.

In one or more embodiments the buffer module 230 stores the state information 270 and sensor data 280 in the database 119 for a first amount of time. The buffer module 230 can manage the storage of information related to a target vehicle, including the state information 270 and sensor data 280, for example, using a first in, first out (FIFO) method, a sliding window algorithm, or the like.

At operation 340, the classification module 240 analyzes one or more of the state information 270 and sensor data 280 to derive the motion information 290 for the target vehicle. As previously discussed, the motion information 290 comprises a position history that indicates a movement pattern for the preceding vehicle.

Figure 5A:
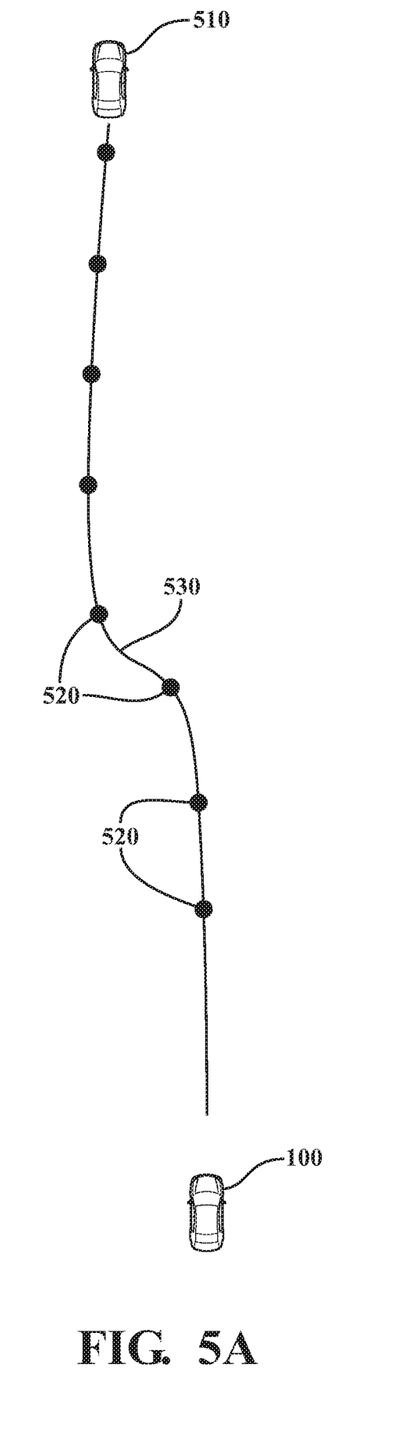
FIG. 5A illustrates a determined movement pattern of a target vehicle according the disclosed embodiments.
Figure 5B:
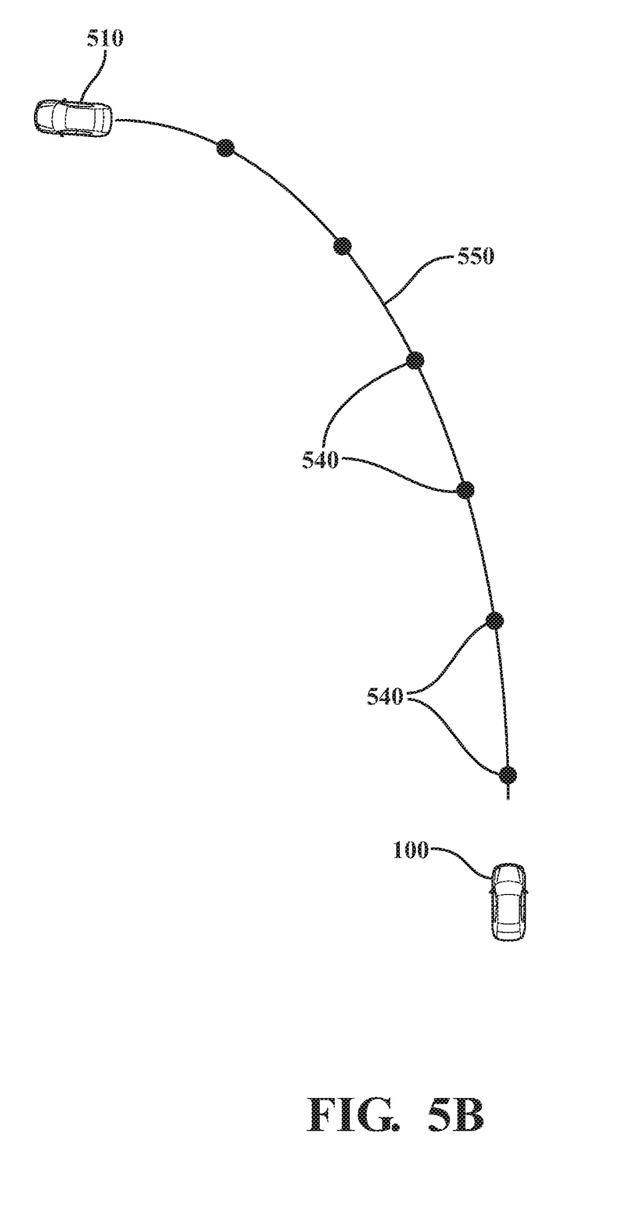
FIG. 5B illustrates another determined movement pattern of a target vehicle according the disclosed embodiments.

FIGS. 5A and 5B depict example position histories and movement patterns based on motion information 290. In FIG. 5A, the classification module 240 determines motion information 290 that includes positions 520 that the target vehicle 510 has been detected at ahead of the ego vehicle 100. The positions 520, in aggregate, form a movement pattern 530. Similarly, FIG. 5B depicts positions 550 that in aggregate form a movement pattern 550 of a target vehicle 510 that differs from the movement pattern 530 depicted in FIG. 5A. It should be understood that while the positions 520, 540 are depicted spaced apart to facilitate understanding, the resolution of the positions 520, 540 can be increased or decreased as warranted or in line with the processing capabilities of a given implementation of the disclosed lane change detection system 170.

Referring back to FIG. 3, at operation 350, the lane change detection system 170 checks whether the ego vehicle 100 has arrived at the decision point. If the ego vehicle 100 has not arrived at the decision point, the system 170 continues to collect sensor data 280, state information 270, and motion information 290 regarding the target vehicle as discussed at operation 330. If the ego vehicle 100 has arrived at the decision point, the system 170 continues as discussed at operation 360.

At operation 360, the classification module 240 analyzes the movement pattern of the preceding vehicle to determine whether the preceding vehicle has changed lanes. In one embodiment, the classification module 240 includes instructions to compare a pattern of movement indicated by the stored state information 270 and the stored motion information 290 against one or more labeled movement patterns. In another embodiment, the classification module 240 uses a machine learning classifier trained to identify movement patterns that indicate a lane change. For example, the classification module 240 can be trained on labeled movement patterns that represent known situations, including lane changes, turns, holding patterns, etc., executed in multiple road geometries. In either implementation, the classification module 240 is configured to identify patterns and output a decision based on the identification. For example, the classification module 240 can determine that the S-shaped movement pattern 530 (FIG. 5A) corresponds to a pattern of a preceding vehicle executing a lane change, and that the curved movement pattern 550 (FIG. 5B) corresponds to a pattern of a preceding vehicle entering a curved path without executing a lane change. Thus, the lane change detection system 170 can determine whether a preceding vehicle has changed lanes.

At operation 370, the system 170 continues by checking whether a lane change was detected. If the classification module 240 detected a lane change, at operation 380 the system 170 generates a notification, for example, as an indication to advanced driving assistance systems (ADAS) of the vehicle 100, autonomous driving systems/modules of the vehicle 100, or to a driver of the vehicle. In this way the lane change detection system 170 improves the overall functioning of the vehicle 100 through adding additional information to the situational awareness of the driver and/or driving systems.

If the classification module 240 detected no lane change, at operation 390 the classification module 240 stores the movement pattern in the database 119 as a path estimation 250 for the path ahead of the ego vehicle 100. That is, if the preceding vehicle did not change lanes, then it may be presumed that the preceding vehicle remained in and followed the lane in the road ahead of the ego vehicle 100. In this case, the path estimation 250 can function as an accurate estimation of the physical road geometry ahead of the ego vehicle 100.

At operation 395 the system 170 checks whether the target vehicle is still present. If the system 170 no longer detects the target vehicle, then the process ends. If the system 170 detects the target vehicle is still present, for example, as evidenced by continued receipt of the state information 270 from the target vehicle or continued identification of the target vehicle in the sensor data 280, then the system 170 continues by cycling back to block 320 for the setting of a new decision point.

As previously mentioned, the range module 220 can set the position of the decision point differently for an initial detection of a target vehicle as opposed to for an ongoing tracking of the target vehicle. Accordingly, when the process cycles back to operation 320 to set a second or subsequent decision point, the range module 220 can factor in multiple additional parameters to determine the position of the next decision point. Such factors can include the extent of any existing path estimates for a target vehicle, the processing speed of the system 170, the maximum allowed buffer for estimations, and the tradeoff between estimation accuracy and estimation duration.

Figure 4B:
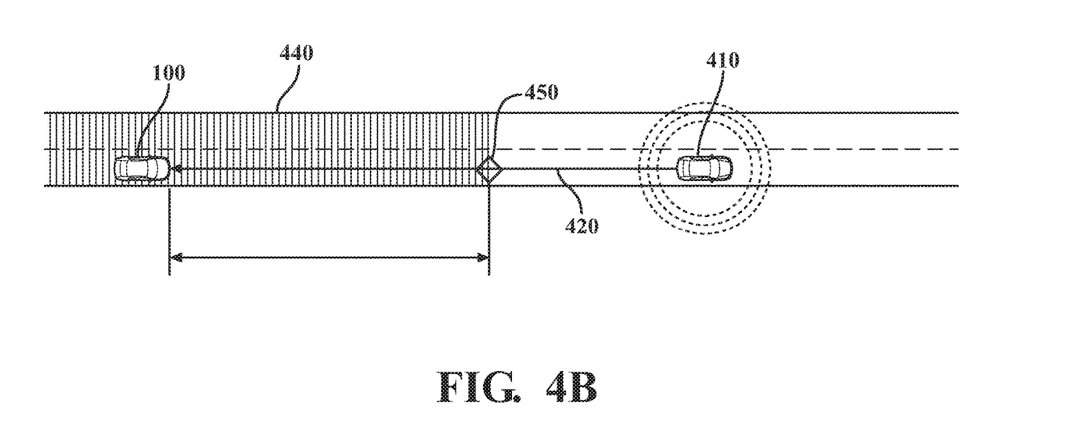
FIG. 4B illustrates another scenario of an ego vehicle setting a decision point according to the disclosed embodiments.

For example, FIG. 4B depicts a scenario in which the ego vehicle 100 has been detecting the target vehicle 410 for multiple decision cycles. The ego vehicle 100 receives state information 270 via a V2V communication 420, therefore the target vehicle remains detected. The ego vehicle 100 is currently still within the range of the most recent path estimate 440. In this case, the range module 220 can set the next decision point 450 at a distance D equal to the distance between the ego vehicle 100 and the end of the current path estimation 440, thereby reducing the amount of distance the ego vehicle 100 will travel without a path estimation 440.

While the method 300 (FIG. 3) has been described with reference to a single decision point cycle applied to a single preceding vehicle, it should be understood that the disclosed lane change detection system can track multiple preceding vehicles simultaneously. Furthermore, multiple decision points can be set for any given vehicle, resulting in an increased likelihood of detecting a lane change and overlapping path estimations when no lane change is detected.

Thus, the disclosed lane change detection system provides improved lane change detection capabilities by utilizing a V2V communication device to receive state information 270 about a target vehicle, one or more sensors to acquire sensor data 280, which includes motion information 290 about the target vehicle, a range module to determine a location of a first decision point located a first distance ahead of the ego vehicle 100, a buffer module to store the state information 270 and the motion information 290 for a first amount of time, a classification module to determine whether the target vehicle has changed lanes based, at least in part, on the stored state information 270 and the stored motion information 290 that is available once the ego vehicle 100 has reached the first decision position.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane change detection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane change detection system 170, and/or the autonomous driving module(s) 160 may control some or all of these vehicle systems 140 and, thus, may be partially or fully autonomous.

The processor(s) 110, the lane change detection system 170, and/or the autonomous driving module(s) 160 can be operatively connected to communicate with the various vehicle systems 140 and/or individual components thereof. For example, returning to FIG. 1, the processor(s) 110, the lane change detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane change detection system 170, and/or the autonomous driving module(s) 160 may control some or all of these vehicle systems 140.

The processor(s) 110, the lane change detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane change detection system 170, and/or the autonomous driving module(s) 160 can control the direction and/or speed of the vehicle 100. The processor(s) 110, the lane change detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data. The autonomous driving module(s) 160 can be further configured to receive lane change detection notifications and/or path estimations as described above.

The autonomous driving module(s) 160 either independently or in combination with the lane change detection system 170 can be configured to determine travel path(s), for example, based on the path estimations 250, and determine current autonomous driving maneuvers for the vehicle 100, future autonomous driving maneuvers and/or modifications to current autonomous driving maneuvers based on data acquired by the sensor system 120 and/or lane change detection system 170, driving scene models, and/or data from any other suitable source such as determinations from the sensor data 280 as implemented by the classification module 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane change detection system of an ego vehicle, comprising:
    one or more processors;
    a communication device that receives communications from a target vehicle specifying at least state information about the target vehicle;
    one or more sensors configured to acquire motion information about the target vehicle; and
    a memory communicably coupled to the one or more processors and storing:
        a range module including instructions that when executed by the one or more processors cause the one or more processors to determine a first decision point at a first distance ahead of the ego vehicle, the first decision point being a location at which the lane change detection system will determine whether the target vehicle has changed lanes;
        a buffer module including instructions that when executed by the one or more processors cause the one or more processors to store the state information and the motion information for a first amount of time; and
        a classification module including instructions that when executed by the one or more processors cause the one or more processors to determine whether the target vehicle has changed lanes based, at least in part, on the state information and the motion information that is stored once the ego vehicle has reached the first decision position.

2. The lane change detection system of claim 1, wherein the buffer module includes instructions to collect the state information and the motion information at least over the first distance to aggregate observations of the target vehicle.

3. The lane change detection system of claim 1, wherein the state information includes coordinates indicating a position of the target vehicle.

4. The lane change detection system of claim 1, wherein the state information includes first speed data and first location data for the target vehicle.

5. The lane change detection system of claim 4, wherein the range module includes instructions to determine the location of the first decision point based, at least in part, on the first location data and first speed data for the target vehicle and on second position data and second speed data of the ego vehicle.

6. The lane change detection system of claim 1, wherein the classification module includes instructions to compare a pattern of movement indicated by the state information and the motion information against one or more labeled movement patterns to determine whether the target vehicle has changed lanes.

7. The lane change detection system of claim 6, wherein, when the classification module determines that the target vehicle has not changed lanes, the classification module includes instructions to determine a path estimation of road geometry based on the pattern of movement indicated by the state information and the motion information.

8. The lane change detection system of claim 1, wherein:
    the range module includes instructions to, in response to the one or more sensors or the communication device indicating that the target vehicle remains ahead of the ego vehicle after the ego vehicle passes the first decision point, determine a second decision point a second distance ahead of the ego vehicle;
    the buffer module includes instructions to store additional state information from the communication device and additional motion information from the one or more sensors; and
    the classification module includes instructions to determine whether the target vehicle has changed lanes based on the state information and motion information that has been stored once the ego vehicle has reached the second decision position.

9. A method of detecting a lane change of a target vehicle ahead of an ego vehicle, the method comprising:
    receiving communications from the target vehicle specifying at least state information about the target vehicle;
    determining a first decision point at a first distance ahead of the ego vehicle, the first decision point being a location at which to determine whether the target vehicle has changed lanes;
    acquiring sensor data about the target vehicle;
    determining motion information about the target vehicle based on the sensor data, the motion information including a plurality of positions that the target vehicle occupied relative to the ego vehicle;
    storing the state information and the motion information for a first amount of time; and
    determining whether the target vehicle has changed lanes based, at least in part, on the state information and the motion information that has been stored once the ego vehicle has reached the first decision position.

10. The method of claim 9, further comprising collecting the state information and the motion information at least over the first distance to aggregate observations of the target vehicle.

11. The method of claim 9, wherein the state information includes coordinates indicating a position of the target vehicle.

12. The method of claim 9, wherein the state information includes first speed data and first location data for the target vehicle.

13. The method of claim 12, further comprising determining the location of the first decision point based, at least in part, on the first location data and first speed data for the target vehicle and on second position data and second speed data of the ego vehicle.

14. The method of claim 9, further comprising comparing a pattern of movement indicated by the state information and the motion information against one or more labeled movement patterns to determine whether the target vehicle has changed lanes.

15. The method of claim 14, further comprising, when the target vehicle has not changed lanes, determining a path estimation of road geometry based on the pattern of movement indicated by the state information and the motion information.

16. The method of claim 9, further comprising:
when the target vehicle remains ahead of the ego vehicle after the ego vehicle passes the first decision point, determining a second decision point a second distance ahead of the ego vehicle;
storing additional state information and additional motion information about the target vehicle; and
determining whether the target vehicle has changed lanes based on the state information and motion information that has been stored once the ego vehicle has reached the second decision position.

17. A non-transitory computer-readable medium for detecting a lane change of a target vehicle ahead of an ego vehicle and including instructions that, when executed by one or more processors, cause the one or more processors to:
receive communications from the target vehicle specifying at least state information about the target vehicle;
determine a first decision point at a first distance ahead of the ego vehicle, the first decision point being a location at which to determine whether the target vehicle has changed lanes;
acquire sensor data about the target vehicle;
determine motion information about the target vehicle based on the sensor data, the motion information including a plurality of positions that the target vehicle occupied relative to the ego vehicle;
store the state information and the motion information for a first amount of time; and
determine whether the target vehicle has changed lanes based at least in part on the state information and the motion information that has been stored once the ego vehicle has reached the first decision position.

18. The non-transitory computer-readable medium of claim 17, further including instructions that cause the one or more processors to collect the state information and the motion information at least over the first distance to aggregate observations of the target vehicle.

19. The non-transitory computer-readable medium of claim 17, further including instructions that cause the one or more processors to compare a pattern of movement indicated by the state information and the motion information against one or more labeled movement patterns to determine whether the target vehicle has changed lanes.

20. The non-transitory computer-readable medium of claim 19, further including instructions that cause the one or more processors to, when the target vehicle has not changed lanes, determine a path estimation of road geometry based on the pattern of movement indicated by the state information and the motion information.

* * * * *